Figure 2A:
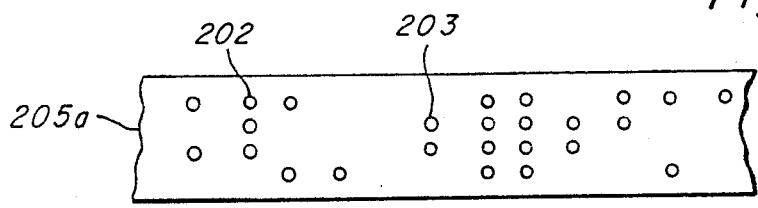

United States Patent [19]

Naden

[11] 4,425,099

[45] Jan. 10, 1984

[54] EDUCATIONAL AID FOR USE WITH WORKBOOK

[75] Inventor: Rex A. Naden, Lubbock, Tex.

[73] Assignee: Texas Instruments Incorporated, Dallas, Tex.

[21] Appl. No.: 310,599

[22] Filed: Oct. 13, 1981

[51] Int. Cl.³ .............................................. G09B 7/00
[52] U.S. Cl. .................... 434/335; 434/311; 434/339; 235/462
[58] Field of Search ............... 434/308, 311, 313, 316, 434/325, 339, 327; 235/462; 179/1 SA

[56] References Cited

U.S. PATENT DOCUMENTS

| | | | |
|---|---|---|---|
| 2,822,425 | 2/1958 | Hicks | 434/313 |
| 3,280,481 | 10/1966 | Ryan | 434/311 |
| 3,516,176 | 6/1970 | Cleary et al. | 434/325 X |
| 3,698,100 | 10/1972 | Frank | 434/325 |
| 3,775,864 | 12/1973 | Bisinger et al. | 434/325 |
| 3,784,794 | 1/1974 | Allais . | |
| 3,892,974 | 7/1975 | Ellefson . | |
| 3,939,579 | 2/1976 | Andrews et al. | 434/316 |
| 4,209,836 | 6/1980 | Wiggins, Jr. et al. | 179/1 SA X |
| 4,210,802 | 7/1980 | Sakai | 235/462 |
| 4,243,224 | 1/1981 | Spector | 434/327 X |
| 4,258,624 | 3/1981 | Mitsui . | |
| 4,337,375 | 6/1982 | Freeman | 235/462 X |

Primary Examiner—William H. Grieb
Attorney, Agent, or Firm—William E. Hiller; Leo N. Heiting; Melvin Sharp

[57] ABSTRACT

An educational learning aid which obtains its procedural data via bar code or other indicia imprinted on the edge of detachable work book sheets. The aid holds the detachable sheet over a touch sensitive array of switches so that touching or marking of the sheet is sensed by the underlying switches in the aid. The correct content of the answers is communicated to the aid by a bar code or machine readable section either on a work sheet or on a second sheet. In this fashion the operator responds to printed material on the sheet and is verbally reinforced by the learning aid for correct answers. Preferably a running tally of the operator's correct responses is kept and he is informed at the end of the exercise of his score. This score is optionally printed upon the paper upon completion of the exercise.

33 Claims, 12 Drawing Figures

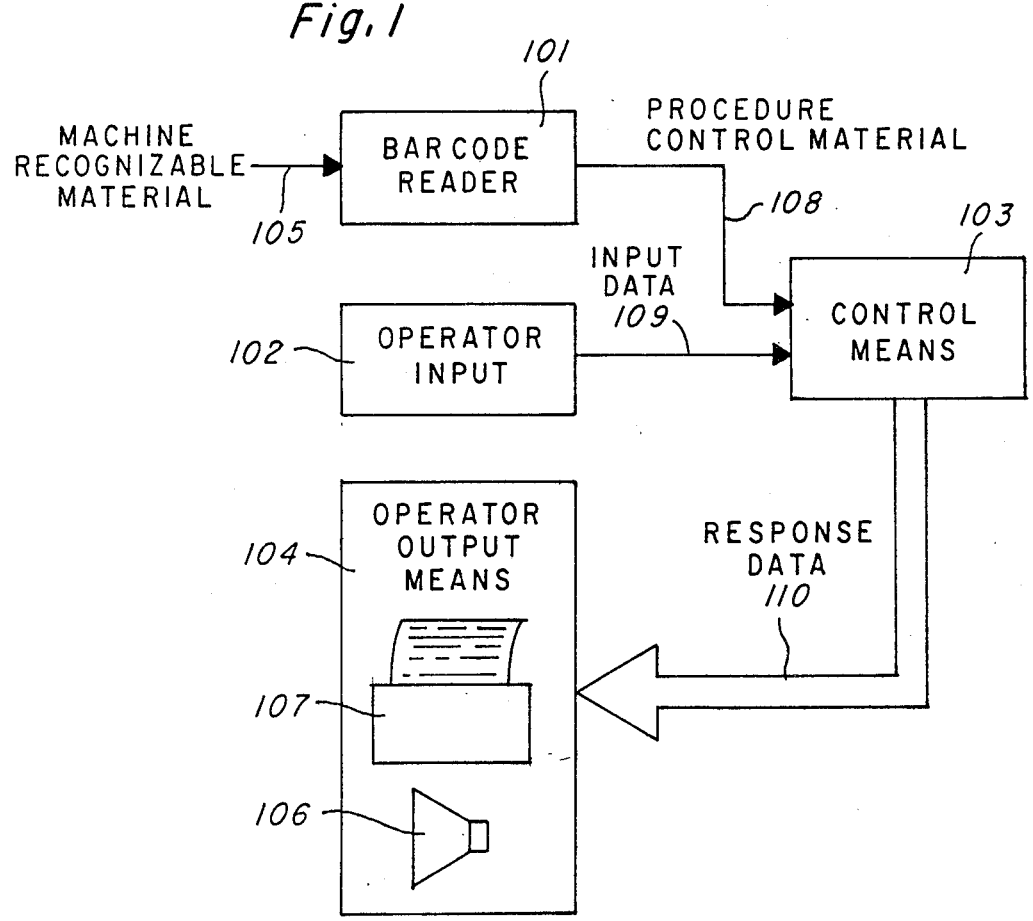

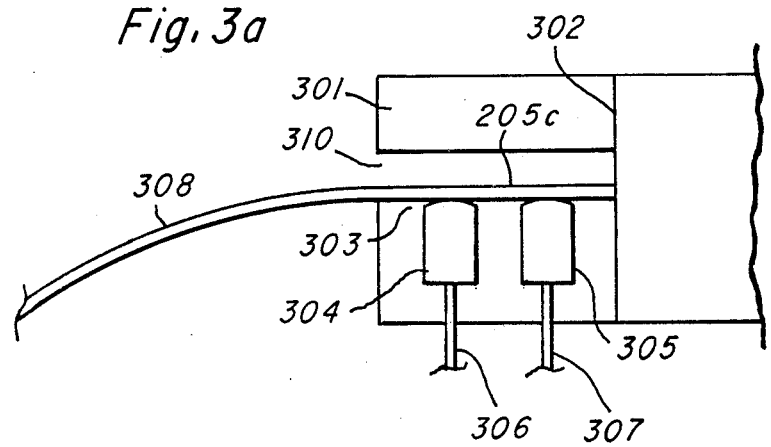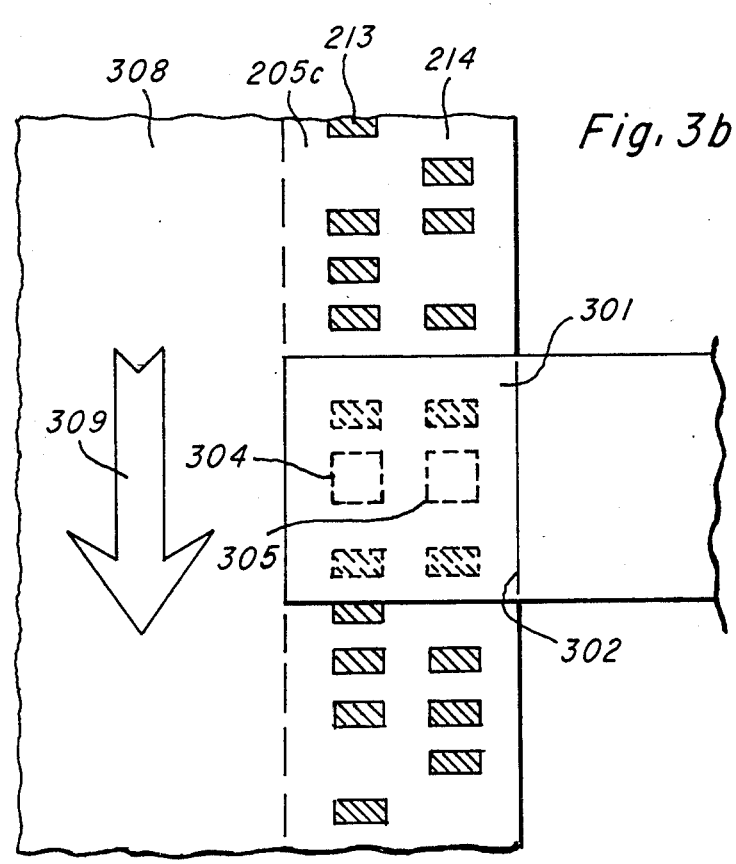

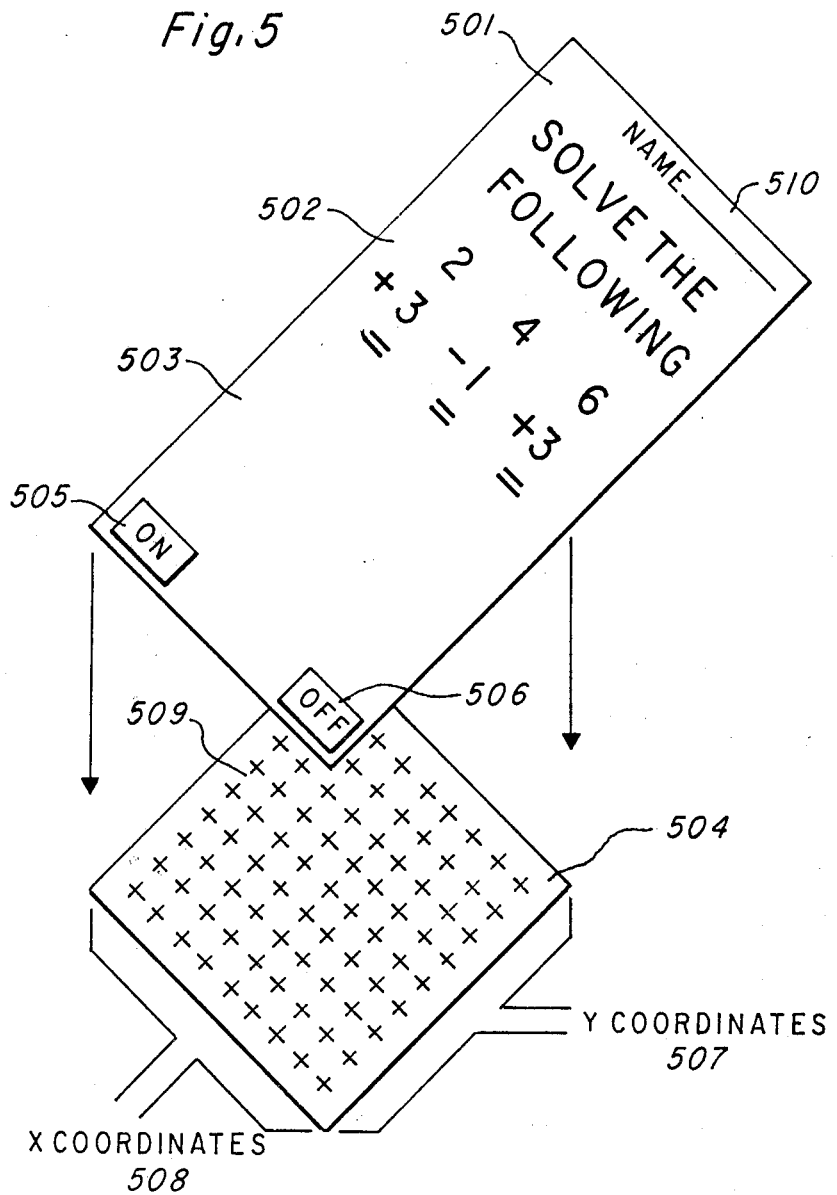

EDUCATIONAL AID FOR USE WITH WORKBOOK

BACKGROUND

This invention relates to electronic learning aids and more particularly to learning aids which alter their problem repertoire.

Learning aids typically have an established repertoire of problems which are presented to the student either in an ordered progression or in a random progression. These problems are either presented in a visual manner, such as via a display, or auditorily via a speech prompting message. The student responds to the problem, typically through a keyboard entry, and the machine compares the student's response to the internally stored correct response and either praises or provides a negative response accordingly. One such learning aid is the Speak and Spell TM electronic learning aid by Texas Instruments Incorporated of Dallas, Texas.

In some learning aids, the repertoire of problems which a learning aid is capable of presenting to the student is expandable via plug in memories such as a read-only-memory (ROM). The ROM though requires extensive electronic engineering and therefore is expensive. Additionally, the insertion of a plug in ROM into the aid requires some technical familiarity and therefore is cumbersome for the less technically trained younger student. A further hindrance is in the alteration or preparation of a new set or repertoire of problems which requires a long lead time since the problems must first be developed, reduced to analogous electronic drawings and subsequently implemented in an electronic device. This lead time does not allow the flexibility required so that the less technical, yet more adept teacher has the opportunity to develop and fine tune problems for a specific age group.

In an attempt to allow more flexibility, and to bring the learning ability to a younger age, some electronic learning aids have been developed which employ a stiff plastic overlay having imprinted thereon certain shapes and symbols recognizable to the younger student. These shapes and symbols are such things as trees, dogs, cars, etc. The student is verbally prompted to "touch the tree" and an underlying array of touch sensitive switches detects when the student has pressed the appropriate spot on the overlay plastic. One such electronic learning aid is the Touch and Tell TM electronic learning aid by Texas Instruments Incorporated of Dallas, Texas. Again the repertoire of overlays which the learning aid is capable of handling is expandable through the addition of detachable or plug in memories.

This electronic learning aid suffers from the same memory deficiencies as the others since it requires a longer lead time for development of problem sets and additionally utilizes permanent exchangeable overlays.

All of the above electronic learning aids suffer from a learning curve or unfamiliarity problem since younger students, typically ages three through ten, are used to utilizing workbook type problem sets wherein the students are presented a number of varying problems including varying pictorial representations on one or more workbook pages. The students write down proposed answers, on the workbook pages and submit these pages to their teacher for appropriate analysis and grading. The current electronic learning aids do not fit into the accepted and normal operational scheme for this student group.

Paper workbooks are particularly well suited for the education of the young since they provide a space for calculation, space for responding, a sheet for submission to the instructor, and a hard copy for later reference (or to show a parent). Of particular importance is the low cost and extreme ease by which the notebook is made and updated.

The students are familiar with the format and use of a notebook but the aids presently available are unable to provide the benefits of a paper notebook (low cost, familiarity, etc) with the benefits of electronic learning aids (self pacing, unlimited patience, etc.)

DESCRIPTION OF THE INVENTION

The invention herein is to be used in conjunction with a medium having both operator recognizable material and machine recognizable material thereon. The present electronic learning aid has a reader for the machine recognizable material, an input means, an output means, and a control means which utilizes the data from the input means in relation to the machine recognizable material in formulating the output of the output means.

The present invention utilizes printed workbooks as currently used by students. This allows a student to mark on a workbook sheet and respond to the questions posed thereon and still have a hard copy for submission to a human instructor or for his or her own later reference. The advantages of ease in creation, lowered cost, and student familiarity are also retained.

The workbook sheets are associated with a set of machine readable or machine recognizable material, such as bar code or the like. This machine readable material is optionally either on the worksheet to which the machine readable material relates, or is on a source medium which is to be used in conjunction with the worksheet.

The present electronic learning aid has a reader for the machine recognizable material and translates it into procedure control data so as to inform the control means within the electronic aid of the correct answers and/or format of the questions. The sheet of paper from the work book is placed or held in a position so that as the operator contacts the paper, this contact is communicated via an operator input means to the control means.

Numerous readers exist for reading machine recognizable material such as bar code. Two such readers are disclosed in U.S. Pat. No. 3,784,794 issued Jan. 8, 1974, to Allais entitled "Electro-optical Reader for Bar Codes or The Like" and U.S. Pat. No. 3,892,974 issued July 1, 1975, to Ellefson et al entitled "Unitary Flexible Circuit For Pen Reader", both of which are incorporated by reference. Both references show wands, their electronics, and optics used to read bar code as a machine recognizable material.

The operator input means is preferable an array of touch sensitive switches. These switches communicate the location of the contact and when put in context with the other activated switches within the input means, allow the control means to formulate a character recognization or structural characteristics of the contact which the student has placed on the sheet. An alternate embodiment allows the sheet to contain discrete boxes designating a particular answer such as "yes", "1", "2", "false" etc. The student therefore makes an entry with a pencil or crayon and the aid is informed of the position and hence the content of the entry.

To the student it appears that the machine is "watching" the entry on the sheet of paper and is capable of determining the correctness of the student's response based upon the printed question. The control means formulates response data, which is relative to the correctness of the student's entry, and communicates this to the student via an output means.

In the preferred embodiment, the output means is a voice synthesis device so as to be able to communicate verbally with children who do not have the capability of reading. One such speech synthesis device is disclosed in the U.S. Pat. No. 4,209,836 issued to Wiggins, Jr. et al on June 24, 1980, incorporated hereinto by reference. The Wiggins, Jr. et al patent utilizes an integrated circuit device to digitally synthesize human speech using a linear predictive filter.

The student's entries are evaluated as to their correctness and preferably a score is assigned to each entry. The score or correctness of the entry is communicated to the student and upon completion of the entire set of questions or tasks, a total value or score is given to the student. In the preferred embodiment this score is also permanently affixed or typed onto the workbook sheet so that it represents a corrected copy for the student to keep or to hand in to the instructor. One such means for printing is disclosed in U.S. Pat. No. 4,258,624 issued to Mitsui on Mar. 31, 1981, incorporated hereinto by reference. The Mitsui patent discloses a small size printer which allows the printing to take place in a small electronic aid.

Two forms of the workbook sheets are used. The first form contains a single or plurality of cards or sheets which contain the machine recognizable material and allow entry of the procedure control data for the entire workbook or for a portion thereof.

An alternative embodiment form has the machine recognizable material imprinted directly on the workbook page so that, for operation, the student removes the sheet from the workbook and passes the machine recognizable material through a reader before affixing the sheet to the electronic aid as discussed above. In an alternative embodiment of the learning aid, the machine recognizable material is read via an automatic reader once the paper has been affixed to the electronic aid.

The machine recognizable material consists of an encoding scheme which allows the machine to recognize the data contained therein. Examples of this machine recognizable material are bar code, magnetic tape, and punched tape.

An apparatus and organization of bar code is described on U.S. patent application Ser. No. 240,675, filed Mar. 5, 1981, by Richard Barnes entitled "Machine Readable Transparent Ink Code Associated With Printed Text" (TI-8598), incorporated hereinto by reference. The Barnes application discloses an invisible bar code for its encoded machine recognizable material but the machine recognizable material is optionally a visible bar code.

The machine recognizable material is provided so as to describe with sufficient detail the proper sequence of answerss and/or questions associated with the workbook sheet. To contain sufficient data for this description, bar code is optionally extendable around all four edges of the workbook sheet. Another preferred embodiment contains multiple lines of bar code.

As a typical operation, the student removes the desired worksheet from the workbook and passes the bar code portion past a reader. The worksheet is placed in a holder and the student is prompted to complete a particular task such as "In the box, spell the name of the first figure, a dog." The student attempts an answer whereupon the learning aid responds accordingly such as "That is very good, now try the next figure, a tree." Upon completion of the entire work sheet, the score of the task is printed on the worksheet. The student turns the worksheet in to the instructor or parent.

The worksheet contains an area which is operator recognizable such as a picture of a tree, numeric equations, or spelled out instructions. In the preferred embodiment this area also contains a scented portion which emits a scent when scratched. This scented portion allows the electronic aid to tutor the student on the smells as well as the visual representations of a variety of articles such as pine trees (pine scent), lemons (lemon scent), and the like.

The invention and further embodiments thereof will be more fully explained and illustrated by the following drawings and their accompanying descriptions.

DRAWINGS IN BRIEF

FIG. 1 is a functional block diagram of an embodiment of the invention.

FIGS. 2a, 2b, 2c, 1 and 2d graphically illustrate encoding schemes and sensing criteria of embodiments of the machine recognizable material.

FIGS. 3a and 3b pictorially illustrate an embodiment for reading the machine recognizable material.

Figure 4:
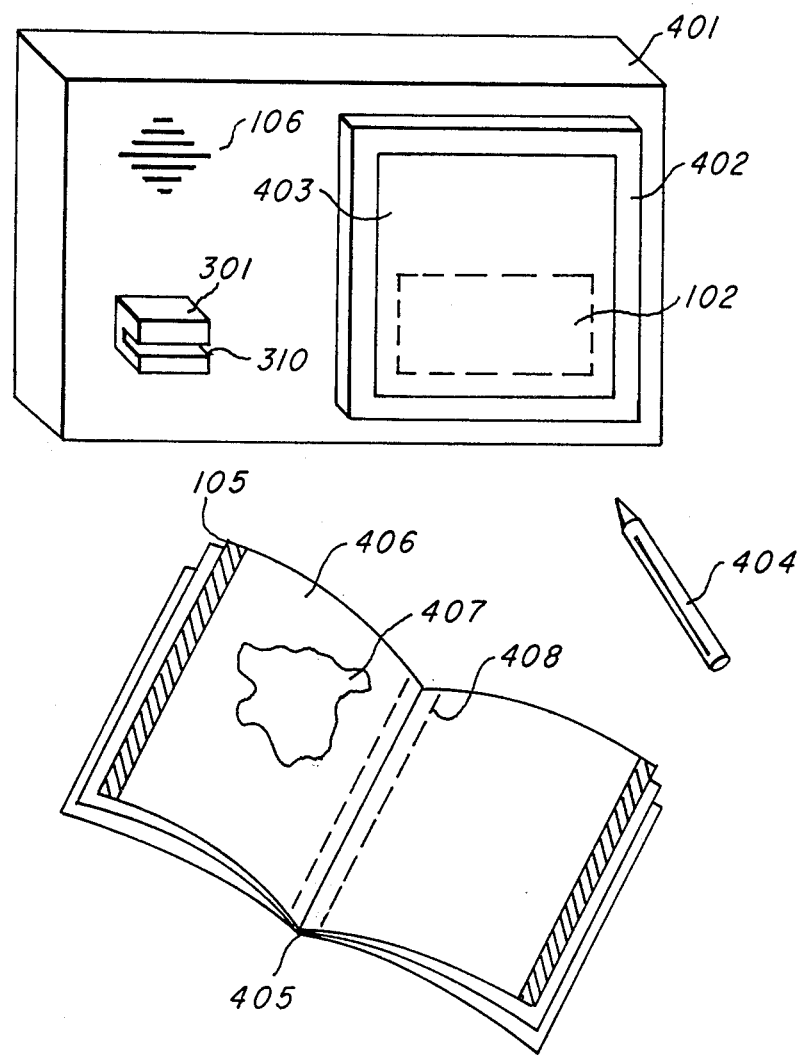

FIG. 4 pictorially illustrates an embodiment of the invention with workbook.

FIG. 5 graphically illustrates the positional relationship of a sheet of paper from a workbook as associated with operator input means of an embodiment of the invention.

Figure 6A:
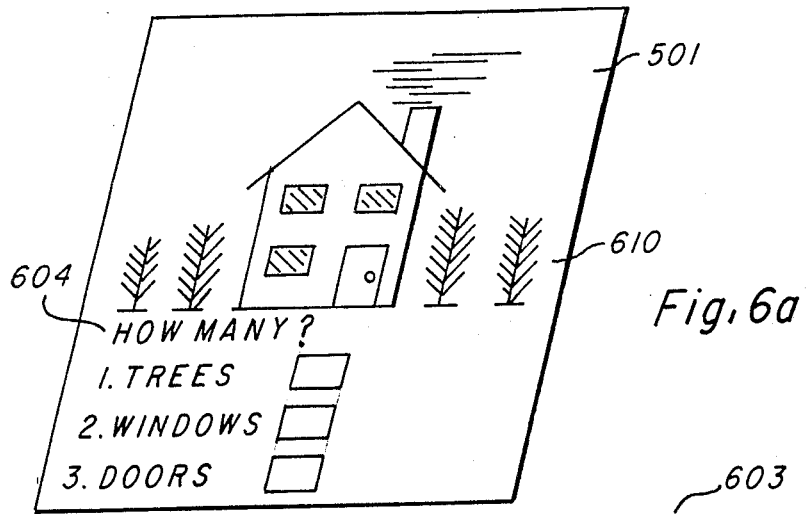
Figure 6B:
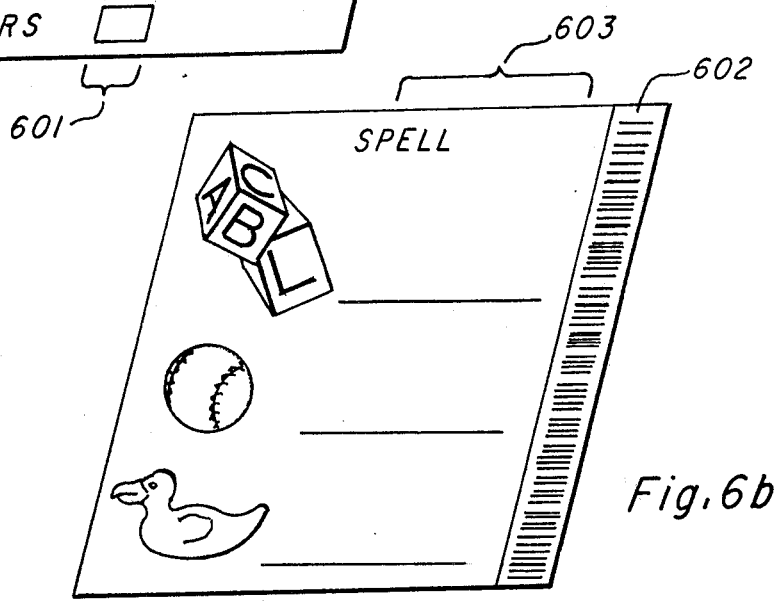
Figure 6C:
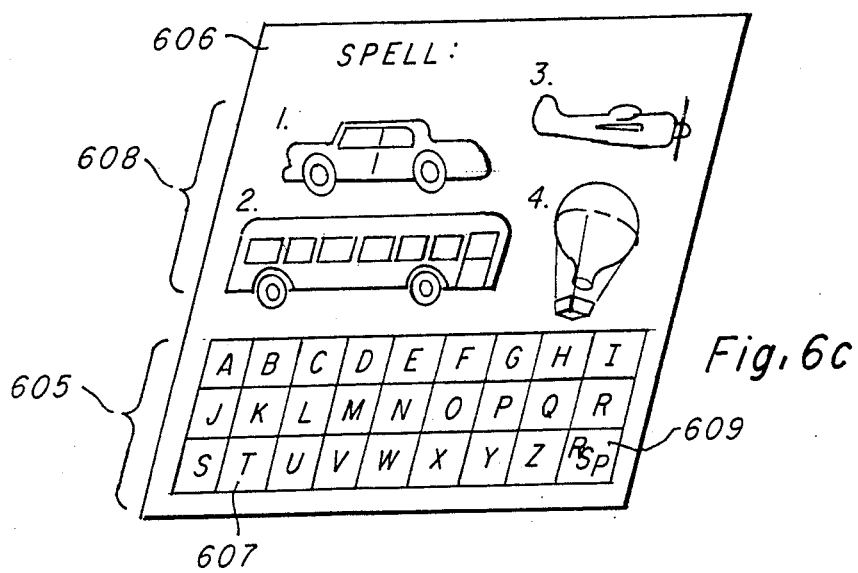

FIGS. 6a, 6b, and 6c illustrate examples of alternative embodiments of the workbook sheets.

DRAWINGS IN DETAIL

FIG. 1 is a functional block diagram of an embodiment of the invention. Machine recognizable material 105 is received by a bar code reader 101 and translated to a procedure control data string 108 communicated to control means 103. In this embodiment of the invention, bar code is used as the machine recognizable material.

Through the use of an operator input 102 and a sheet of paper, not shown, the operator enters a string of input data 109 to the control means 103. By utilizing the procedure control data 108 in relationship to the input data 109, the control means 103 generates response data 110 which is communicated to the operator via operator output means 104.

The operator output means 104 in this embodiment contains a printer 107 and a speech synthesizer 106. The operator/student is prompted to respond to the problems via the speaker of the speech synthesizer 106 and the result or score of the response is recorded via the printer 107. Additionally the operator's score is also communicated to the operator via the speaker of the speech synthesizer 106.

As an example of the interaction between the student and the electronic aid, the control means 103 directs the speaker of the synthesizer 106 to speak "Now count the trees". The operator touches the trees on the sheet of paper, not shown, and then presses a designated area on the sheet to indicate completion of the task. Should the number of touches and their locations coincide with the data communicated to the control means 103 by the bar code reader 101, then the control means 103 responds via the speaker of the speech synthesizer 106 in a positive manner such as "Good job"; otherwise the control means 103 responds via the speaker of the speech synthesizer 106 in a manner such as "No you missed the tree in the left corner".

An alternative implementation has the digits 1–10 represented on the paper whereby the operator presses the appropriate digit to respond. This "soft keyboard" allows the key shape and size to be defined by the printer 107 and that shape and size to be described to the control means 103 by the machine recognizable material 105.

The machine recognizable material acts as a reprogramming of the electronic aid in that it describes with enough clarity for the aid, the relative set of tasks, their appropriate answers, relative positions of keys or shapes, etc. The machine recognizable material is used in the analysis of the input data so as to evaluate its appropriateness.

In this fashion the student is provided a learning aid which has unlimited patience and proceeds at the pace appropriate for the student's unique ability. The student is able to pace himself without the necessity of having a human instructor present. Similarly, inexpensive and expendable worksheets are readily supplied having encoded thereon the machine recognizable material which alters the operation of the electronic aid to be commensurate with the present task without an expensive electrical engineering expenditure.

FIGS. 2a, 2b, 2c and 2d illustrate possible alternative embodiments of the machine recognizable material.

In FIG. 2a, a punch hole tape 205a is illustrated having holes punched therein. This hole configuration is communicated via a reader to the electronic aid. In this embodiment, each column of holes, such as 202 and 203, is encoded to communicate a 4 bit number; therefore, up to sixteen selections may be made in any column. The reading of the column, such as 202, communicates information to the control means 103 of the electronic aid so as to define therein the operation, task, or solutions to the problems presented on the sheet of paper.

Figure 2B:
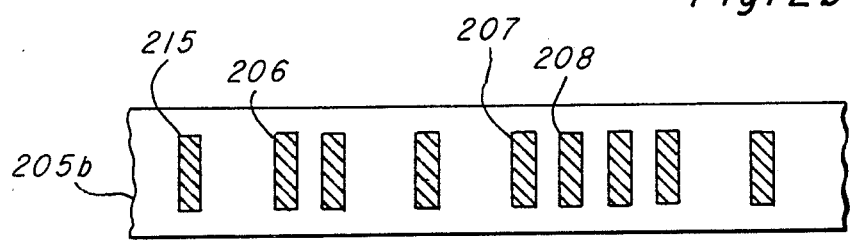

In FIG. 2b, a bar code 205b is illustrated having variously spaced-apart black lines so as to be commuicative of the procedure control data.

Figure 2C:
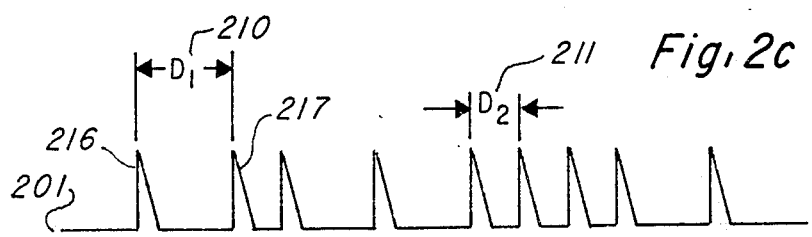

In FIG. 2c, a pulse signal 201 from the reader 101 is illustrated. Referring to both FIGS. 2b and 2c, as the reader 101 passes bar 215, a pulse 216 is communicated via the reader 101. A similiar pulse 217 arises on the threshold of the bar 206. The distance $D_1$ between these pulses 216 and 217 designated as 210, is indicative of either a "0" or a "1" depending upon the selection of the reader 101 and its encoding scheme. Similary pulses occur upon the threshold of bars 207 and 208 to yield a distance $D_2$ designated as 211. The differences of the distances $D_1$ and $D_2$ differentiates between "0" or a "1" bit respectively.

Figure 2D:
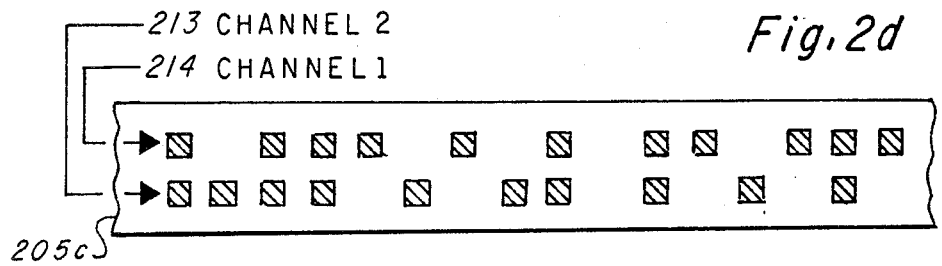

FIG. 2d is illustrative of a bar code scheme in which a dual channel is utilized. Strip 205c contains two channels, channel 1 designated as 214, and channel 2, designated as 213. Each channel is read independently of the other; strip 205c therefore has double the density of information of a single channel strip such as 205b. The channel theory is extendable to 3, 4, 5, or more channels. Use of multiple channels requires that means for positioning the read head or heads over the bar code be used.

Each channel within the strip 205c is read and deciphered as the single channel version of strip 205b.

FIGS. 3a and 3b pictorially illustrate an embodiment of the reader which allows the input of the multiple channel bar code of FIG. 2d.

In FIG. 3a, a side view is given illustrating an embodiment of the reader 301. A sheet of paper 308 is inserted into the slot 310 of the reader 301 so that strip 205c lies within slot 310. The paper 308 rests on a table 303 and is constrained on one side by a right stop 302. Two read heads 304 and 305 are used for reading and sensing the threshold of the bar code for the two channels. The heads 304 and 305 each generate an electronic signal 306 and 307 respectively for the bar code. These signals 306 and 307 are communicated to a decipher means, not shown, to generate the sequence of bits associated wiith the strip 205c.

In FIG. 3b, a top view of the reader 301 and paper 308 is illustrated. As the paper 308 is moved in the direction of arrow 309, the bar code channels 213 and 214 pass over the read heads 304 and 305 inside the reader 301. The channels 213 and 214 are kept properly aligned relative to the heads 304 and 305 by the constraint imposed by the stop 302 within the reader 301.

The use of multiple channels is particularly important where a large amount of data is to be communicated to the electronic learning aid or where the space is limited.

FIG. 4 pictorially illustrates an embodiment of the invention. The electronic learning aid 401 has contained therein the electronics necessary for the operation of the aid. A workbook 405 is utilized by the student in the operation. A particular sheet 406 of the workbook 405 is detached by the student along a line of perforations 408 and the machine recognizable material 105 is passed through the slot 310 of the reader 301. This communicates the procedure control data to the electronic control means within the electronic learning aid 401.

The sheet 406 is then affixed to the electronic learning aid via the holder 402. In this embodiment, the sheet 406 covers a non-activatable area 403 and the operator input 102. The operator input 102 is comprised of an array of touch sensitive switches so that upon contact with the paper 406 by the student via a pencil 404, the location of the contact is communicated to the control means within the electronic learning aid 401.

The electronic learning aid 401 communicates with the student via the speaker of the speech synthesizer 106 so as to prompt and respond to the student's input.

Once the student has completed a particular page 406, it is removed from the electronic learning aid and a second or third page is inserted. Note that page 406 contains both the machine recognizable material 105 and operator recognizable material 407. The operator recognizable material 407 is in the form of textual or pictorial representations from which the student optically perceives and can extract data.

The machine recognizable material 105 contains material from which the electronic learning aid is able to extract information. This information alters the operations and repertoire of tasks which the learning aid is capable of performing.

As illustrated, the notebook 405 contains many pages and is only limited by the author's imagination and the printer's skill. The machine recognizable material 105 alters the electronic learning aid to be appropriate for the page in question and hence is not dependent upon a change of electronics but rather by, as illustrated here, a change in the printed bar code along the edge of the applicable sheet.

FIG. 5 illustrates the positional relationship of the sheet of paper relative to the operator input in an embodiment of the invention. The sheet of paper 501 contains a text area 502 and a blank area 503 for entry of the student's response. Additionally, sheet 501 contains discrete boxes 505 and 506 for entry of "On" and "Off" respectively. The sheet 501 is placed over the operator input means 504 so that the blank area 503 overlies a portion of the operator input means 504.

The operator input means 504 is constructed of an array of touch sensitive switches such as switch 509. The activation of a switch is communicated to the control means, not shown, in the form of a Y coordinate 507 and an X coordinate 508. Knowledge of these coordinates allows the control means to recognize which particular switch has been activated. When a set of these switches has been activated, the control means is capable of performing an algorithm on an activation to determine if the proper response has been given by the student to the questions posed in the textural part 502 of the sheet 501.

The discrete areas 505 and 506 allow activation or inactivation respectively of the electronic learning aid by pressure or contact with the paper 501.

Note that the entire sheet need not overlay the operator input, only the portion of the sheet which the electronic aid is to evaluate; hence, even though the student enters his name on line 510, this entry is not perceived by the aid since the entry does not address any of the questions posed on the work sheet 501.

FIGS. 6a and 6b illustrate sample alternative embodiments of the work sheets.

In FIG. 6a, sheet 501 contains a pictorial representation with a question 604 wherein the answers are to be placed in designated boxes in area 601.

In one embodiment of the invention, a scented portion overlays particular shapes so that as the area is scratched, it emits an odor associated with the printed shape, such as a lemon or pine tree. For example, as the student scratches pine tree 610, the learning aid states "This is a pine tree" and thereby gives a combination of auditory and olfactory instructions as to the item. Two senses are thereby capitalized upon. Similarly the student scratches a non-identified scent (a black scent panel) and then tries to identify what scent it is.

FIG. 6b illustrates an alternative embodiment in which the machine recognizable material 602 is imprinted directly on the page so as to allow the detachment of the sheet and direct entry of the procedure controlled data prior to insertion of the sheet.

FIG. 6c illustrates the use of a soft keyboard in that the keys are defined in the printing process. The pressing of paper 606 by contacting key 607 communicates the entry of the associated letter. For key 607, this letter is a "T". This allows the operator to "type" in the spelling of the pictures 608 as if the learning aid had a traditional keyboard. As discussed before, the bar code associated with page 606 teaches the learning aid the proper location and identification of the keys within the keyboard 605. Once the operator has completed the spelling task, the response key 609 is activated, signifying an end of the task.

The soft keyboard is particularly useful in the scent identification problem where the student is asked to identify an unidentified scent. After scratching the scent panel, the student may enter "Lemon" as a proposed answer, for example, and is corrected or rewarded depending on the correctness of the answer.

Note that the input area of each sheet in FIGS. 6a, 6b, and 6c is different. The only criteria on the organization of the problems on the sheet is that the answers to be analyzed must be positioned for acceptance by the operator input means.

The present invention allows the use of an electronic learning aid in conjunction with detachable sheets so that the student capitalizes both upon a familiar medium (a workbook) and the patience with self pacing of an electronic learning aid. The modification or alteration of the problem set is accomplished via data communicated to the electronic learning aid in a machine recognizable medium imprinted upon paper and not through a change in electronics. Low cost and ease in alteration of problems are thereby achieved.

What is claimed is:

1. An educational aid to be used in conjunction with sheets having recorded both operator recognizable material and machine recognizable material thereon, the educational aid comprising:
   a. means for reading the machine recognizable material and generating procedure control data therefrom;
   b. operator input means for generating operator input data;
   c. means for holding a sheet positioned so that at least a portion of the sheet so held overlays at least a portion of said operator input means;
   d. output means for generating signals perceivable by an operator; and
   e. control means for utilizing the procedure control data in relation to said operator input data and for generating response data therefrom, said control means communicating said response data to said output means.

2. The education aid according to claim 1 further comprised of memory means for storage of said response data and wherein said control means includes means for selecting a particular response data from said memory means.

3. The educational aid according to claim 2 wherein said memory means is detachable.

4. The educational aid according to claim 1 wherein said machine recognizable material includes bar code.

5. The educational aid according to claim 4 wherein said control means includes means for generating score data in response to said operator input data.

6. The educational aid according to claim 5 wherein said score data is communicated to the operator via said output means.

7. The educational aid according to claim 5 further comprised of means for recording said score data on the sheet.

8. The educational aid according to claim 7 wherein said means for recording the score data includes a printer.

9. The educational aid according to claim 1 wherein said operator input means includes an array of touch sensitive switches.

10. The educational aid according to claim 9 wherein said control means includes means for character recognition based upon input from said array of touch sensitive switches.

11. The educational aid according to claim 9 wherein said output means includes speech synthesis means.

12. The educational aid according to claim 9 wherein said means for reading operates during application of the sheet to the means for holding.

13. An educational combination comprising:
    a workbook containing a plurality of detachable sheets therein, at least one of said plurality of said sheets having recorded thereon operator recognizable material and machine recognizable material; and
    an electronic aid having,
    a. means for reading the machine recognizable material and generating procedure control data therefrom,
    b. operator input means for generating operator input data,
    c. means for holding a sheet positioned so that at least a portion of the sheet so held overlays at least a portion of said operator input means;
    d. output means for generating signals perceivable by the operator, and
    e. control means for utilizing the procedure control data in relation to said operator input data and for generating response data therefrom, said control means communicating said response data to said output means.

14. The educational combination according to claim 13 further comprised of memory means for storage of said response data and wherein said control means includes means for selecting a particular response data from said memory means.

15. The educational combination according to claim 14 wherein said memory means is detachable.

16. The educational combination according to claim 14 wherein said control means includes means for generating score data in response to said operator input data.

17. The educational combination according to claim 16 wherein said score data is communicated to the operator via said output means.

18. The educational combination according to claim 16 further comprised of means for recording said score data on the sheet.

19. The educational combination according to claim 18 wherein said means for recording the score data includes a printer.

20. The educational combination according to claim 14 wherein said machine recognizable material includes bar code.

21. The educational combination according to claim 20 wherein said operator input means includes an array of touch sensitive switches.

22. The educational combination according to claim 21 wherein said control means includes means for character recognition based upon input from said array of touch sensitive switches.

23. The educational combination according to claim 21 wherein said output means includes speech synthesis means.

24. The educational combination according to claim 23 further including means for activating said means for reading upon application of the sheet to the means for holding.

25. The educational combination according to claim 23 wherein at least one of said sheets of said workbook includes a scent portion thereon.

26. An operator interactive educational learning aid for use with a data-containing record medium on which at least operator recognizable material is provided, wherein machine recognizable material is provided with one of said operator interactive educational learning aid and said data-containing record medium, said educational learning aid comprising:
    means for reading the machine recognizable material and generating procedure control data therefrom;
    operator input means for generating operator input data;
    means for temporarily retaining said data-containing record medium in a position disposing at least a portion thereof in overlying registering relationship with respect to at least a portion of said operator input means;
    control means responsive to said procedure control data in relation to said operator input data for generating response data based upon the appropriateness of said operator input data; and
    output means coupled to said control means for generating signals in response to said response data from said control means perceivable by an operator and indicative of the appropriateness of said operator input data.

27. An operator interactive educational learning aid for use with a data-containing record medium on which at least operator recognizable material is provided, wherein machine recognizable material is provided with one of said operator interactive educational learning aid and said data-containing record medium, said educational learning aid comprising:
    a housing having a major surface adapted to be disposed in confronting relation to an operator;
    record medium holding means disposed on said major surface of said housing and adapted to temporarily retain at least a portion of said data-containing record medium disposed on said major surface of said housing;
    operator input means for generating operator input data, said operator input means being disposed on said major surface of said housing at least partially within the boundary of said record medium holding means, said operator input means being adapted to underlie at least a portion of said data-containing record medium when said data-containing record medium is temporarily held in position by said record medium holding means with at least a portion thereof being disposed on said major surface of said housing;
    means operably associated with said housing of said educational learning aid for reading the machine recognizable material corresponding to said data-containing record medium and generating procedure control data therefrom;
    control means within said housing and responsive to said procedure control data in relation to said operator input data for generating response data indicative of the appropriateness of said operator input data; and
    output means operably associated with said housing of said educational learning aid and coupled to said control means for generating signals in response to said response data from said control means perceivable by an operator and indicative of the appropriateness of said operator input data.

28. An educational learning system comprising:
    a workbook having a plurality of data-containing pages, at least one of said plurality of data-containing pages having operator recognizable material disposed thereon;

an electronic educational learning aid operably associated with said workbook;

one of said workbook and said electronic educational learning aid having machine recognizable material included therewith;

said electronic educational learning aid comprising means for reading the machine recognizable material and generating procedure control data therefrom, operator input means for generating operator input data in response to an operator input, means for temporarily retaining at least said page having said operator recognizable material disposed thereon in a position in which at least a portion of said page overlies at least a portion of said operator input means, control means responsive to said procedure control data in relation to said operator input data for generating response data indicative of the appropriateness of said operator input data, and output means coupled to said control means and responsive to said response data provided thereby for generating signals perceivable by the operator and indicative of the appropriateness of said operator input data.

29. An educational learning aid system comprising:

a workbook having a plurality of data-containing pages therein, at least one of said plurality of data-containing pages having operator recognizable material disposed thereon, said operator recognizable material being in a form constituting at least one request directed to an operator to which an operator response is desired;

an electronic educational learning aid operbly associated with said workbook;

one of said workbook and said electronic educational learning aid having machine recognizable material included therewith, said machine recognizable material corresponding to operator recognizble material as provided on said at least one page of said workbook and constituting procedure control data representative of machine instructions relating to said at least one request including the correct response thereto;

said electronic educational learning aid comprising:

a housing having a major surface adapted to be disposed in confronting relationship to an operator, operator input means disposed in said housing and having a plurality of individually actuatable switches disposed on said major surface of said housing and adapted to be selectively actuated by an operator to generate an operator response, means for reading said machine recognizable material and generating said procedure control data to relate said electronic educational learning aid to a particular page of said workbook containing operator recognizable material, means on said housing for temporarily retaining said particular page of said workbook containing operator recognizable material on said major surface with at least a portion of said page overlying at least a portion of said operator input means, said operator input means generating an operator response to a request provided by said operator recognizable material on said page in response to selective operator contact on said page actuating at least one of said switches underlying said page, control means within said housing operably coupled to said reading means and said operator input means, said control means being responsive to said procedure control data generated by said reading means and to said operator response generated by said operator input means to provide response data indicative of the appropriateness of said operator response with respect to the correct resonse coresponding to said request provided by said operator recognizable material on said page, and output means coupled to said control means for generating signals in response to said response data from said control means perceivable by the operator and indicative of the appropriateness of said operator response.

30. An educational learning aid system as set forth in claim 29, wherein said machine recognizable material is provided on said at least one of said plurality of pages of said workbook and corresponds to said operator recognizable material as provided on the same page of said workbook.

31. An educational learning aid system as set forth in claim 30, wherein said reading means is disposed on said housing and is provided with a page-receiving slot defined therein for accepting respective pages of said workbook on which said machine recognizable material is provided, and said reading means further including at least one reading head in registration with said page-receiving slot and having a field of view in which said machine recognizable material as provided on a page of said workbook is disposed when said page is received within the slot.

32. An educational learning aid system as set forth in claim 31, wherein said machine recognizable material comprises bar code, and said reading means comprises a bar code reader.

33. An educational learning aid system as set forth in claim 32, wherein said output means includes speech synthesis means.

* * * * *